Patented Nov. 14, 1922.

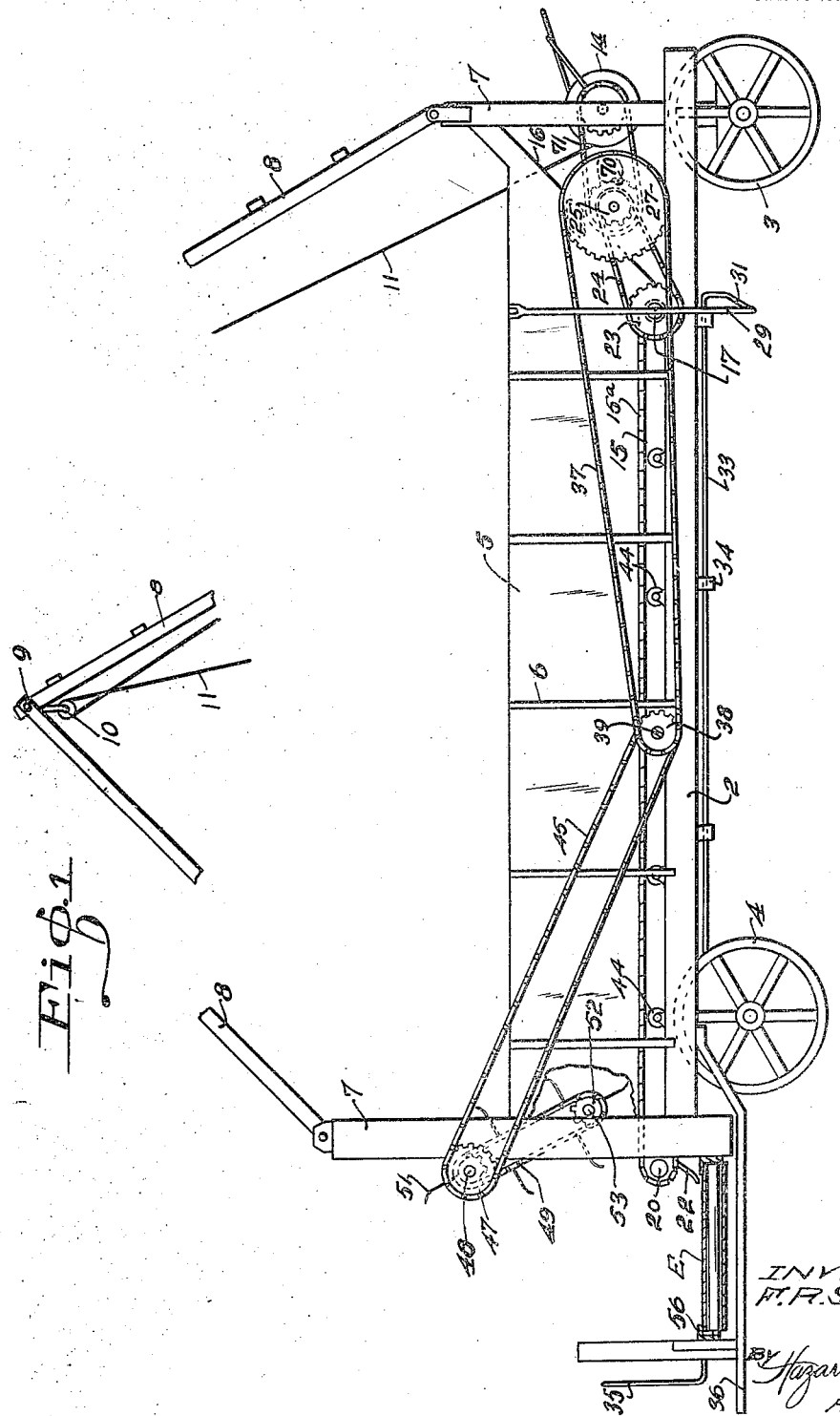

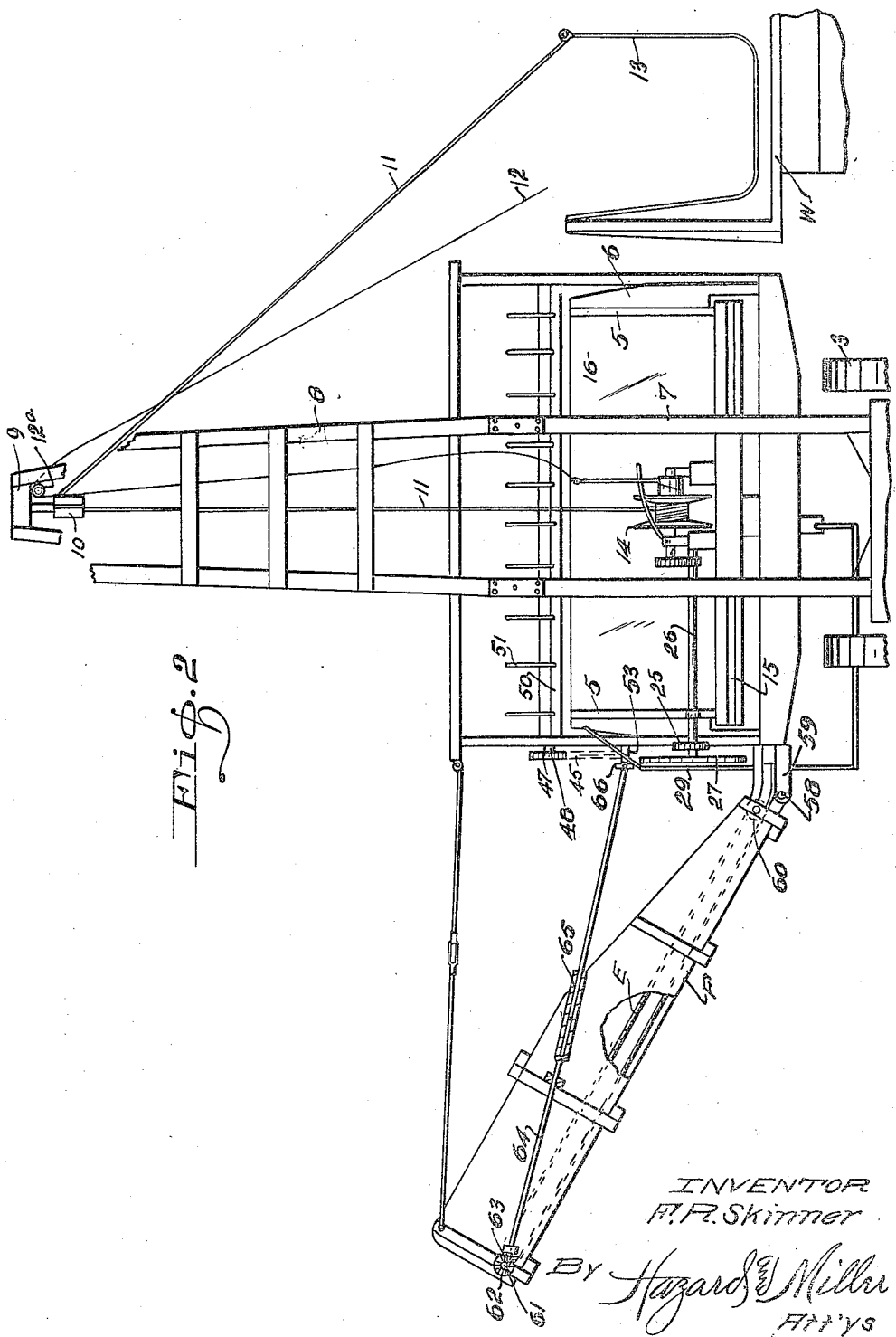

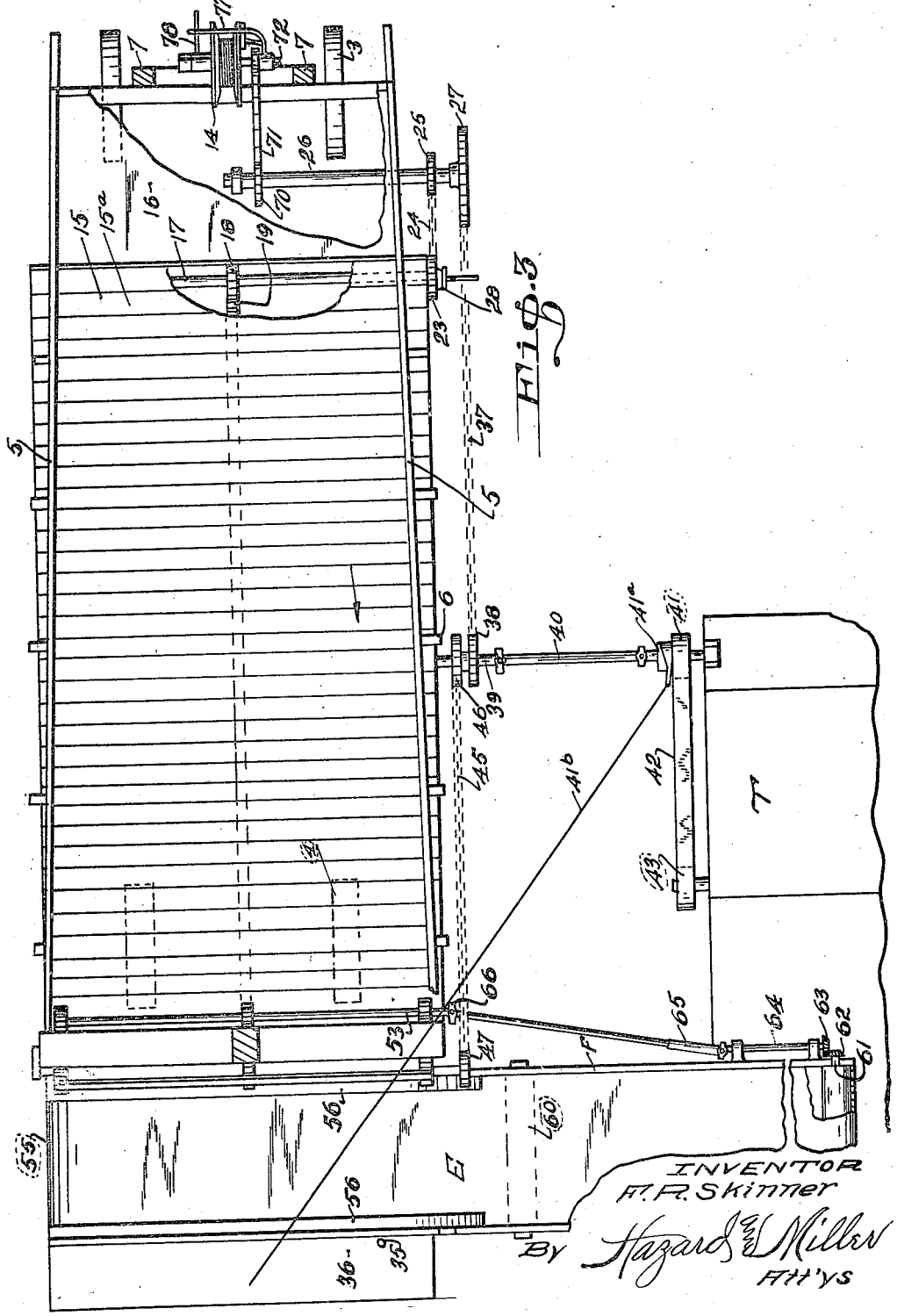

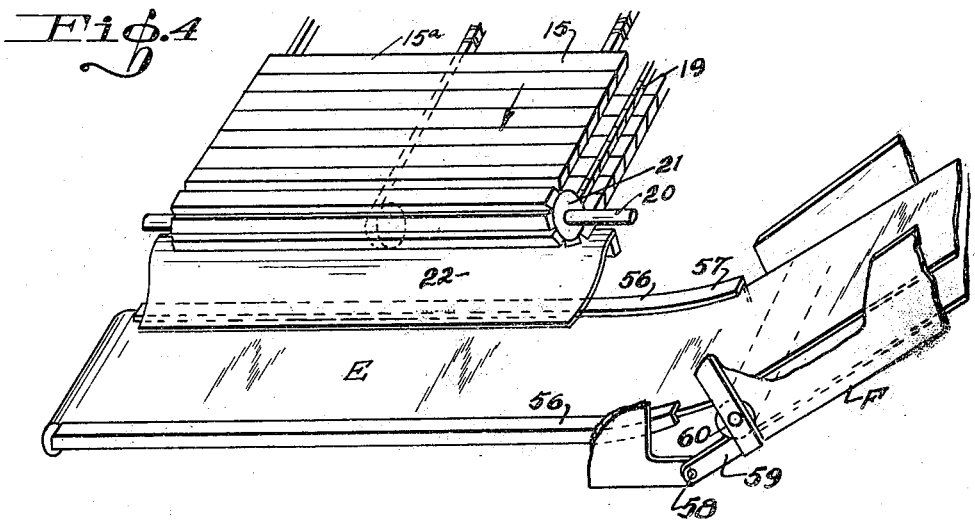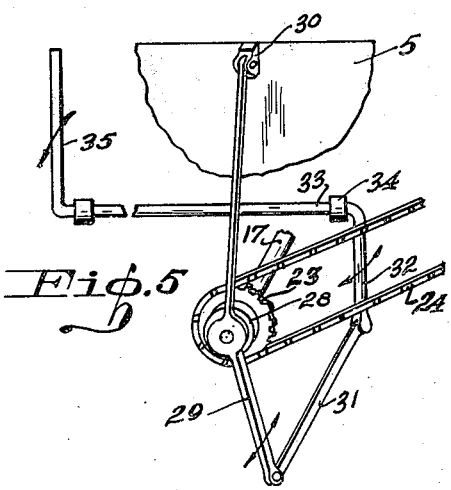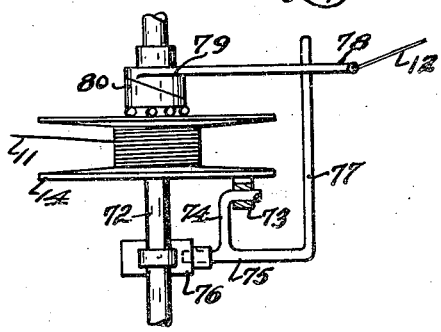

1,435,342

UNITED STATES PATENT OFFICE.

FRANK R. SKINNER, OF SANTA ANA, CALIFORNIA, ASSIGNOR OF ONE-THIRD TO F. E. GROOVER, OF SANTA ANA, CALIFORNIA, AND ONE-THIRD TO FRANK MUSSLEMAN, OF SANTA ANA, CALIFORNIA.

GRAIN AND BEAN FEEDER.

Application filed January 26, 1920. Serial No. 354,067.

*To all whom it may concern:*

Be it known that I, FRANK R. SKINNER, a citizen of the United States, residing at Santa Ana, in the county of Orange and State of California, have invented new and useful Improvements in Grain and Bean Feeders, of which the following is a specification.

This invention relates to an apparatus for feeding grain, beans and other farm products to threshing or other apparatus, and has for its object to provide a device that will efficiently operate for the conveying of grain such as oats, wheat, barley etc., and also for feeding various kinds of beans on the vines and in the pods to a contiguous threshing apparatus; and it is a further object of the present invention to so improve apparatus of this character as to materially reduce not only the waste commonly incident to the transfer of grain and beans from a rack like structure to a threshing machine, but also to provide a machine that will appreciably reduce the cost of recovering the desired product or crop by the reduction of the number of hands or laborers employed commonly in harvesting grain and beans. The invention further has for its object to provide a combined grain rack and stacker in which the parts are arranged not only for efficient and economical operation in the matter of the product produced, but also in the consumption of power; and a further object is to provide a combined portable rack and stacking or feeding apparatus. The invention consists therefore in the construction, the combination and in details and arrangements of the parts for the accomplishing of the above purposes and an embodiment of the invention is illustrated in the accompanying drawings and described and claimed herein.

Figure 1 is a side elevation of the improved rack showing in cross section a portion of the stacker or elevating means; the view being shortened in height by breaking away the derrick for purpose of convenience.

Fig. 2 is a rear end view of the improved rack and feeder, parts being broken away and in section.

Fig. 3 is a plan view of the apparatus partly broken away and shown as in arrangement with a threshing machine from which power is derived to operate the mechanism of the rack and stacker.

Fig. 4 is a perspective of the front end or the rack traveling bottom and the foot of the elevator or stacker.

Fig. 5 is a detail perspective of the clutch mechanism for throwing out the feeding belt or bottom of the rack.

Fig. 6 is a plan view of the windlass device used for unloading a wagon and dumping the material being handled into the rack.

The illustrated embodiment of the invention comprises a main vehicle frame structure having longitudinal sills 2 at the front of which is arranged a pair of steering and draft wheels 3 and at the rear of which is a pair of supporting wheels 4 all of the wheels being, as shown in Fig. 3, within the vertical side planes of the apparatus for convenience of loading and unloading and access to the rack which includes upright side walls or panels 5—5 supported by stanchions 6 connected to the lower frame structure. The frame may also be provided with front and rear posts or uprights 7—7 on which may be erected a derrick structure including upwardly inclined and converging legs 8 that may be connected at the head 9 from which may be suspended a pulley 10 over which is rove a haul rope 11, one end of which may be connected to the usual net indicated at 13 on which the bean vines or grain straw is pulled when gathered from the windrows in the field, the net being mounted in the body of a wagon W that is drawn up to the rack.

When the wagon is disposed adjacent to the rack the haul rope 11 is connected to the net 13 and then by the application of power as to a winch drum 14, which is arranged at the front end of the vehicle, the load in the net 13 can be readily dumped or rolled over into the rack where it will lodge on a bottom structure consisting, in the preferred form, of an endless traveling slatted bottom or floor 15 which is clearly illustrated in Fig. 4. This floor is arranged to travel snugly beneath the bottom edges of the side walls 5—5 of the rack and for the purpose as will be explained hereinafter. The side walls 5—5 are shown as diverging rearwardly from the front end which may be provided with an inclined floor portion 16 extending upwardly and partly overhanging the winch 14 above mentioned.

The endless traveling floor 15 is composed of transverse slats 15ª of substantial proportions, and these are connected in close longitudinal position so that their longer edges stand in close juxtaposition to form a tight joint and prevent the passage of grain or beans therethrough while the belt or floor is traveling in the direction of the arrow, Fig. 4, to discharge the material on to an elevating belt E, Fig. 4. The front end of the endless traveling slat floor 15 is passed around a driven shaft 17 on which is a set of sprocket wheels 18 engaging respective sprocket chains 19 set in parallelism and to the links of which the several slats 15ª are transversely connected to form the endless movable floor.

The opposite or discharge end of the floor 15 passes around a shaft 20 on which is provided a set of sprocket wheels 21 for the sprocket chains 19; this shaft being disposed transversely across the rear end of the rack frame and above an apron 22 which may consist of a piece of metal arranged below the turn of the floor about the axle 20 and having its lower edge extending over the elevating or feeder belt E so that all of the grain straw and vines being handled will be directed from the endless traveling floor on to the conveying belt E.

Loosely mounted on one end of the shaft 17 is a sprocket wheel 23 meshing with a sprocket chain 24 which, in this case, is extended upwardly to a sprocket wheel 25 secured on a countershaft 26 suitably supported on the framework or the rack and having on its outer end a larger driving gear 27. Since it may be desirable to drive the wheel 27 independently of the shaft 17, the wheel 23 is provided with a clutch device 28 operative by a lever 29, Fig. 5, that is pivoted at its upper end in a bearing 30 on the adjacent side panel 5 of the rack body, and the lower end of the lever is connected by a link 31 to a crank arm 32 of a rock shaft 33 mounted in suitable bearings 34 conveniently arranged on the sill frame 2; the shaft 33 extending longitudinally and rearwardly and having at its rear end a manually operable control lever 35 disposed convenient to the operator's platform 36 which is arranged just in the rear of the elevating belt E so that the operator without changing his station can conveniently throw the lever 35 to disconnect the clutch 28 and unlock the gear 23 from the shaft 17.

Power is transmitted to the wheel 27 as by a sprocket chain 37 extending along one side of the rack and engaging a driving sprocket pinion 38 secured on a jack shaft 39 to which power may be supplied from any suitable source as, in this case, by a flexible shaft 40 having a section with a pulley wheel 41 that is engaged and driven by a belt 42, in this case running over a driving pulley 43 on a shaft of the threshing mechanism indicated at T and into which the grain or bean vines are advanced by the elevator or stacker E.

The pulley wheel 41 is designed to be connected to the shaft 40 by a clutch 41ª from which a line 41ᵇ is extended over to the operator's platform 36 so that the transmission of power to the jacket shaft 39 can be interrupted by disconnecting the clutch wheel 41 from the clutch 41ª.

The endless traveling slat belt or floor 15ª is supported between its end shafts 17 and 20 on idler rollers 44 arranged transversely on the frame and disposed just beneath the upper stretch of the floor so as to hold the latter in operating position just below the bottom edges of the side panels 5—5.

Power is transmitted from the jack shaft 39 by a sprocket chain train including a sprocket chain 45 engaging a wheel 46 secured on the shaft 39 and extending rearwardly and upwardly to a sprocket 47 on an upper shaft 48, in this case, journaled on the rear upright posts 7. On this upper shaft 48 is arranged a series of sprocket chains 49 and these are transversely connected by slats 50, Fig. 2, suitably spaced apart along the chains, and on these slats are provided tines 51 of suitable length. The sprocket chains pass down over a lower set of sprocket wheels 52 that are secured on a transverse shaft 53, this being spaced a suitable height above the rear end of the traveling floor 15 so that when the sprocket belts are driven by the shaft 48 the tines 51 sweep just above and in close juxtaposition to the upper stretch of the floor.

This apparatus is especially useful in the treatment of bean vines which are commonly thoroughly intertwined and matted when they are discharged into the rack between the side walls 5—5 and on to the traveling floor or bed 15. The operation of the tines 51 is to successively engage the batch of intertwined vines and also grain straws if desired and separate or disentangle the same and transfer the vines and straw in a relatively free condition from each other upwardly and over the upper shaft 48 from which the vines and straw fall freely and loosely to the traveling belt E.

The belt E is guided over a drum 55 at one end of the rear extension of the framework of the vehicle and passes transversely across the frame beneath side guide devices 56 in the form of angle irons with horizontal inturned flanges overlapping the top stretch of the belt E. This belt is preferably of a continuous length and is sufficiently long to extend not only transversely across the rack frame but also to extend upwardly on an elevator frame F the lower end of which is pivoted at 58 to brackets 59 extending from the side of the frame, as shown in Fig. 2, and adjacent this pivot 59 the elevator frame F is provided with a roller or drum 60 interposed between the upper and lower stretches of the elevator belt E so as to facilitate the guiding of the same into the elevator frame, the upper end of which is provided with a shaft 61 having on one end a gear 62 engaging a complementary gear 63, in this case, secured on the outer end of a flexible shaft 64 having an extension joint 65. The lower end of this shaft has a flexible joint 66 and is secured to the lower shaft 53 over which the sprocket chains 49 of the grain separating device operates.

To facilitate the guiding of the belt E about the bend made by the relative angular position of the elevator frame F with respect to the frame of the rack, the ends of the guide irons 56 are shown as deflected upwardly as at 57 adjacent the pivot joint 58 where the frame F is connected to the frame of the rack; the intermediate roller 60 being disposed in juxtaposition to the adjacent deflected ends 57 of the guides.

It will be seen that by providing for the continuation of the belt from a position at the discharge end of the flexible floor 15 across the joint connection at the lower end of the frame F and thence upwardly on the same that the loss of grain or beans, that would occur were the elevator or stacker divided, is overcome.

As above referred to the side walls 5—5 of the rack body diverge toward the discharge end of the flexible floor 15 this being for the purpose of preventing the jamming of the vines and straw, of the material being handled, in between the side walls while the substance is being propelled toward the discharge end. In other words the mass is moved toward the widened portion and away from the narrow portion of the chamber formed between the side walls and above the flexible floor 15.

One of the features of the present combination is the provision of connections between the driven mechanism of the belts of the apparatus and the windlass 14 so that the latter can be driven at the will of an operative or attendant to enable the unloading of the straw or vines by power and this is accomplished by mounting on the shaft 26 a sprocket wheel 70 engaging a sprocket chain 71 by which power is transmitted to the shaft 72 of the windlass or winch.

Adjacent to one flange of the windlass drum is a brake shoe 73 pivoted on the end of a crank arm 74 mounted on a rock shaft 75 having a suitable bearing 76. This rock shaft has a lever arm 77 extending transversely across the rear of the drum and is adapted to be engaged by a friction clutch lever arm 78 secured to one member 79 of a friction clutch device 80 by which the windlass drum can be temporarily secured to the shaft 72 when it is desired to drive the drum to wind the haul rope 11.

The lever 78 has connected to it a lanyard 12 extending upwardly to the top of the derrick passing over a guide pulley 12ª and thence downwardly to convenient reach of an operative on or near the wagon W so that when the operative pulls on the lanyard 12 the clutch lever 78 is shifted; the winch drum coupled to the shaft; the haul rope 11 wound on the drum and the load dumped from the net 13 into the rack. When the operative releases tension on the lanyard 12 the lever 78 falls to a position to engage the rock arm 77 and this throws the rock shaft 75 to set the brake 73 against the windlass drum.

Various changes may be made without departing from the spirit of the invention as claimed.

What is claimed is:

1. In an apparatus for feeding material to a thresher, a rack box; an endless conveyor arranged for operation therein; a transversely arranged endless conveyor which receives the material from the discharge end of the first mentioned endless conveyor; and means at the discharge end of the first mentioned endless conveyor for engaging the material, elevating and disentangling the same and delivering it unto the transversely disposed endless conveyor.

2. An apparatus for feeding material to a thresher, comprising a rack box having means for feeding the material towards the discharge end thereof; means arranged transversely to the discharge end of the box for elevating the material discharged from the latter; means at the discharge end of the rack box for engaging the material, elevating and disentangling the same and delivering it unto the lower end of the transversely disposed elevating means; and mechanism operative from a suitable source of power for driving the feeding means; the material engaging and disentangling means and the elevating means; said means including a clutch mechanism whereby the feeding means can be disconnected from the driving means while the elevating means is still operating.

3. A feeding apparatus for advancing material to a threshing apparatus, comprising a rack box with means arranged at the lower portion thereof for advancing the material toward the discharge end of the box; said means comprising a substantially tight slat bottom in the form of an endless belt on to which the material to be threshed may be disposed and by which it will be advanced to the discharge end of the rack; and means at the discharge end of the rack box for separating and disentangling the material to be threshed, and which last mentioned means comprises an upright endless carrier having transversely disposed slats and material engaging prongs projecting from said slats.

4. A feeding apparatus for advancing material to a threshing apparatus, comprising a rack box with means arranged at the lower portion thereof for advancing the material toward the discharge end of the box; said means comprising a substantially tight slat bottom in the form of an endless belt on to which the material to be threshed may be disposed and by which it will be advanced to the discharge end of the rack; an upright endless carrier arranged for operation at the discharge end of said rack box and the advanced means therein, which endless carrier includes transversely disposed bars; elongated material engaging fingers projecting from said bars, which fingers are adapted to lift the material from the advancing means and disentangle said material; and an elevating mechanism arranged transversely across the end of the rack box and on to which the material is received from the lifting and disentangling means.

5. A feeding apparatus for advancing the material to a threshing apparatus, comprising a rack box with means arranged at the lower portion thereof for advancing the material toward the discharge end of the box; said means comprising a substantially tight slat bottom in the form of an endless belt on to which the material to be threshed may be disposed and by which it will be advanced to the discharge end of the rack; an elevating mechanism arranged transversely across the end of the rack box and on to which the material being handled is advanced; said elevating mechanism including an endless belt having a portion guided in a position below the adjacent end of the feeding means and thence continued beyond the side of the rack and inclined upwardly to elevate the material to a suitable point of dicharge and means arranged above the discharge end of the advancing means in the rack box for engaging, lifting and disentangling the material and delivering it in disentangled condition unto the forward end of the transversely disposed carrying and elevating mechanism.

6. In an apparatus for feeding and elevating material to be threshed, a rack box into which the material is loaded, means for advancing the material toward the discharge end of the box means, and means operating continuously to engage, elevate and disentangle the material so as to discharge it in a comparatively free condition on to a conveyor which last mentioned means includes an upright endless carrier having transversely disposed slats and elongated material engaging fingers projecting from said slats.

7. An apparatus for feeding material to be threshed, comprising a rack box having means for feeding the material towards the discharge end of the box; said rack box having side walls that diverge relative to each other toward the discharge end of said box so that the material may be advanced therethrough without jamming; means arranged transversely to the discharge end of the box for elevating the material discharged from the latter; means for engaging and elevating the material from the discharge end of said rack box and for disentangling said material and delivering it in such condition unto the lower portion of the transversely disposed elevating means and mechanism operative from a suitable source of power for driving the feeding disentangling and elevating means.

8. In an apparatus for feeding material to be threshed, a pair of cooperating endless carriers for delivering the material to the thresher; means arranged between said endless carriers for engaging the material, lifting it from one of the endless carriers, disentangling said material and delivering it unto the other one of the endless carriers; and means for simultaneously operating said endless carriers and said material engaging, lifting and disentangling means.

In testimony whereof I have signed my name to this specification.

FRANK R. SKINNER.